(12) United States Patent
Umeda et al.

(10) Patent No.: US 12,273,173 B2
(45) Date of Patent: Apr. 8, 2025

(54) TERMINAL, COMMUNICATION METHOD, AND RADIO COMMUNICATION SYSTEM

(71) Applicant: NTT DOCOMO, INC., Tokyo (JP)

(72) Inventors: Hiromasa Umeda, Tokyo (JP); Hideaki Takahashi, Tokyo (JP); Yuta Oguma, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/422,756

(22) Filed: Jan. 25, 2024

(65) Prior Publication Data

US 2024/0162963 A1 May 16, 2024

Related U.S. Application Data

(63) Continuation of application No. 17/798,220, filed as application No. PCT/JP2020/005659 on Feb. 13, 2020, now Pat. No. 11,916,636.

(51) Int. Cl.
*H04B 7/06* (2006.01)

(52) U.S. Cl.
CPC ............................ *H04B 7/0689* (2013.01)

(58) Field of Classification Search
CPC .... H04B 7/0628; H04B 7/063; H04B 7/0689; Y02D 30/70
See application file for complete search history.

(56) References Cited

U.S. PATENT DOCUMENTS

| | | | |
|---|---|---|---|
| 2010/0062732 A1 | 3/2010 | Kim et al. | |
| 2012/0196637 A1 | 8/2012 | Bergman et al. | |
| 2014/0080422 A1 | 3/2014 | Guo et al. | |
| 2015/0201326 A1* | 7/2015 | Kazmi | H04W 8/24 370/329 |
| 2019/0173559 A1 | 6/2019 | Wu et al. | |
| 2022/0174763 A1* | 6/2022 | Wang | H04W 4/40 |
| 2022/0317232 A1* | 10/2022 | Manolakos | H04W 72/51 |

FOREIGN PATENT DOCUMENTS

| | | |
|---|---|---|
| CN | 103067063 A | 4/2013 |
| CN | 109217881 A | 1/2019 |
| JP | 2014-150550 A | 8/2014 |
| JP | 2016-006991 A | 1/2016 |

OTHER PUBLICATIONS

International Search Report issued in PCT/JP2020/005659 on Aug. 25, 2020 (5 pages).

(Continued)

*Primary Examiner* — Khanh C Tran
(74) *Attorney, Agent, or Firm* — Osha Bergman Watanabe & Burton LLP

(57) ABSTRACT

A terminal is disclosed including a processor and a transmitter. The processor includes, in a UECapabilityInformation message, information indicating whether transmission diversity is supported on a per-band basis. The transmitter transmits, to a base station, the UECapabilityInformation message including the information indicating whether transmission diversity is supported on the per-band basis. In other aspects, a communication method and a radio communication system are also disclosed.

4 Claims, 7 Drawing Sheets

(56) References Cited

OTHER PUBLICATIONS

Written Opinion of the International Searching Authority issued in PCT/JP2020/005659 on Aug. 25, 2020 (4 pages).
3GPP TS 38.300 V15.8.0 "3rd Generation Partnership Project; Technical Specification Group Radio Access Network; NR; NR and NG-RAN Overall Description; Stage 2 (Release 15)" Dec. 2019 (99 pages).
3GPP TS 38.211 V15.8.0; "3rd Generation Partnership Project; Technical Specification Group Radio Access Network; NR; Physical channels and modulation (Release 15)"; Dec. 2019 (97 pages).
3GPP TS 38.214 V15.8.0; "3rd Generation Partnership Project; Technical Specification Group Radio Access Network; NR; Physical layer procedures for data (Release 15)"; Dec. 2019 (106 pages).
Extended European Search Report issued in European Application No. 20918506.5, mailed on Oct. 5, 2023 (11 pages).

* cited by examiner

//www.w3.org/1999/xhtml">
TERMINAL, COMMUNICATION METHOD, AND RADIO COMMUNICATION SYSTEM

CROSS-REFERENCE TO RELATED APPLICATIONS

This application is a continuation application and, thereby, claims benefit under 35 U.S.C. § 120 to U.S. application Ser. No. 17/798,220, filed on Aug. 8, 2022, titled "TERMINAL AND COMMUNICATION METHOD," which is a U.S. National Stage Application of PCT Application No. PCT/JP2020/005659, filed on Feb. 13, 2020. The contents of the priority applications are incorporated by reference in their entirety.

TECHNICAL FIELD

The present invention relates to a terminal and a communication method in a radio communication system.

BACKGROUND ART

In New Radio (NR) (also referred to as "5G"), which is the successor system of Long Term Evolution (LTE), techniques for satisfying, as required conditions, a large capacity system, high data transmission speed, low latency, and simultaneous connection of numerous terminals, low cost, power saving, and the like are being studied (Non-Patent Document 1, for example).

In NR, technical specification documentation for uplink Multiple Input Multiple Output (MIMO) has been developed (Non-Patent Document 2 and Non-Patent Document 3, for example) and commercial use is expected. In a case where an uplink MIMO is supported at a given band, a terminal has at least two antennas capable of being used in the given band. In contrast, studies are underway regarding the use of space diversity or selection diversity for when an uplink MIMO is not used.

RELATED ART DOCUMENT

Non-Patent Document

Non-Patent Document 1: 3GPP TS 38.300 V15.8.0 (2019 December)
Non-Patent Document 2: 3GPP TS 38.211 V15.8.0 (2019 December)
Non-Patent Document 3: 3GPP TS 38.214 V15.8.0 (2019 December)

SUMMARY OF THE INVENTION

Problem to be Solved by the Invention

In a case where a terminal executes communication with a base station, since the terminal is unable to directly ascertain the reception quality, on the base station side, of the uplink signal that was transmitted by the terminal, there is a possibility that a determination as to whether or not transmission diversity is executable cannot be appropriately performed and a possibility that switching to a transmission diversity scheme in a case where transmission diversity is to be executed cannot be appropriately performed.

The present invention has been made in view of the above, and it is an object of the present invention for a terminal to execute a transmission diversity scheme as necessary in a radio communication system.

Means for Solving Problem

According to the disclosed technique, provided is a terminal that includes a transmission unit configured to transmit, to a base station, information indicating whether or not transmission diversity is supported, a reception unit configured to receive, from the base station, information indicating a transmission diversity scheme in a case where transmission diversity is supported, and a control unit configured to switch to a transmission diversity scheme based on the information indicating the transmission diversity scheme, wherein the transmission unit is configured to perform transmission by applying the transmission diversity scheme to which the switch was made.

Effect of the Invention

According to the disclosed technique the terminal in the radio communication system can execute a transmission diversity scheme as necessary.

MODE FOR CARRYING OUT THE INVENTION

An embodiment of the present invention will be hereinafter described with reference to drawings. The embodiment described below is an example, and the embodiment to which the present invention is applied is not limited to the following embodiment.

In operation of a radio communication system according to embodiments of the present invention, existing techniques are used as appropriate. However, an example of existing technique includes an existing LTE, but is not limited to the existing LTE. In addition, the term "LTE" used in this specification has a broad meaning including LTE-Advanced and specifications newer than LTE-Advanced (e.g., NR) unless otherwise specified.

In the embodiments of the present invention described below, terms such as Synchronization signal (SS), Primary SS (PSS), Secondary SS (SSS), Physical broadcast channel (PBCH), Physical random access channel (PRACH), Physical Downlink Control Channel (PDCCH), Physical Downlink Shared Channel (PDSCH), Physical Uplink Control Channe (PUCCH), Physical Uplink Shared Channel (PUSCH), and the like used in the existing LTE are used. This is for convenience of description, and signals, functions, and the like may be referred to as other names. In NR, the above terms correspond to NR-SS, NR-PSS, NR-SSS, NR-PBCH, NR-PRACH, NR-PDCCH, NR-PDSCH, NR-PUCCH, NR-PUSCH, and the like. However, even when signals are used for NR, "NR-" is not necessarily attached thereto.

In the embodiments of the present invention, the duplex method may be a Time Division Duplex (TDD) system, a Frequency Division Duplex (FDD) system, or others (for example, Flexible Duplex and the like).

Further, in the embodiment of the present invention, "to configure" a radio parameter or the like may mean that a predetermined value is configured in advance (Pre-configure), may mean a radio parameter indicated by a base station 10 or a terminal 20 is configured, or may mean that a radio parameter is specified or defined by technical specification document in advance.

Figure 1:
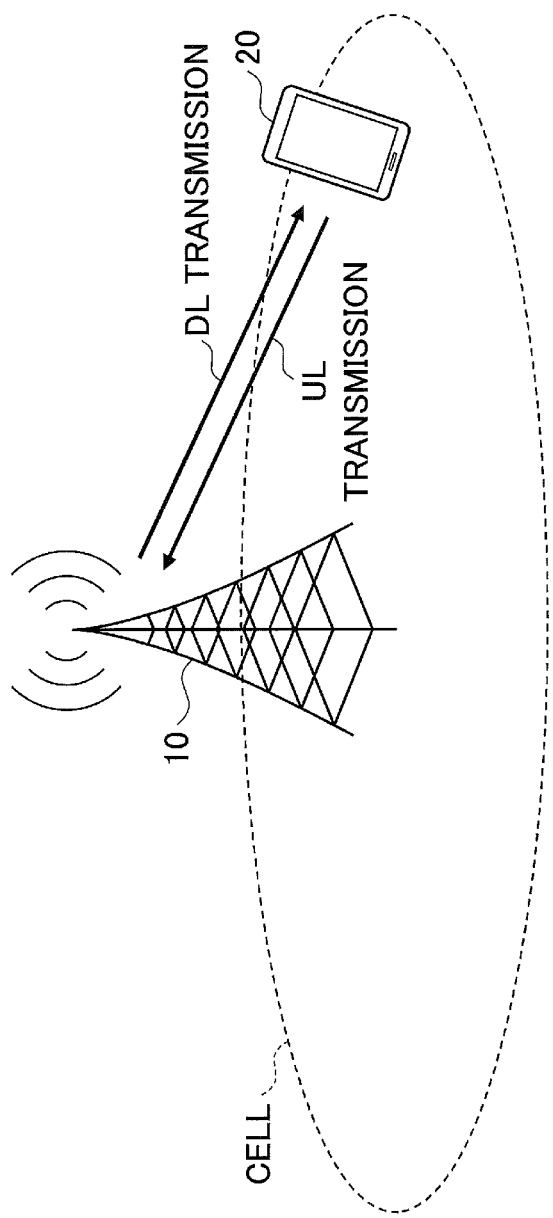
FIG. 1 is a drawing illustrating an example of configuration of a radio communication system according to an embodiment of the present invention.

FIG. 1 is a drawing for explaining a radio communication system according to the embodiment of the present invention. As illustrated in FIG. 1, a radio communication system according to an embodiment of the present invention includes a base station 10 and a terminal 20. In FIG. 1, one base station 10 and one terminal 20 are illustrated, but this is only an example. Alternatively, a plurality of base stations 10 and terminals 20 may be provided.

The base station 10 provides one or more cells, and is a communication apparatus that wirelessly communicates with the terminal 20. The physical resource of a radio signal is defined by time domain and frequency domain. Time domain may be defined by an OFDM symbol number. Frequency domain may be defined by the number of sub-carriers or the number of resource blocks. As illustrated in FIG. 1, the base station 10 transmits a control signal or data to the terminal 20 through downlink (DL), and receives a control signal or data from the terminal 20 through uplink (UL). Both the base station 10 and the terminal 20 can transmit and receive signals by performing beamforming. Both of the base station 10 and the terminal 20 can apply communication based on Multiple Input Multiple Output (MIMO) to DL or UL.

Also, both of the base station 10 and the terminal 20 may perform communication via a secondary cell (SCell) with Carrier Aggregation (CA) and a primary cell (PCell). The radio scheme of the base station 10 that performs CA may be LTE (LTE-E) or may be NR (NR-CA). Further, although not illustrated, the terminal 20 may execute communication with Dual Connectivity (DC) by connecting to multiple base stations 10. In DC, several configurations exist due to differences in the radio section scheme of the base station 10, the interface with the core network, and the controlling subject of the control plane. For example, a DC configuration in which the radio section scheme is E-UTRA (LTE), the interface with the core network is S1 (connection with EPC), the controlling subject of the control plane is the radio base station 10, and the radio section scheme of another base station 10 is NR, may be referred to as EN-DC.

The terminal 20 is a communication apparatus equipped with a wireless communication function such as a smartphone, a mobile phone, a tablet, a wearable terminal, and a communication module for Machine-to-Machine (MTM). As illustrated in FIG. 1, the terminal 20 receives control signals or data from the base station 10 in DL, and transmits control signals or data to the base station 10 in UL, thereby using various communication services provided by the radio communication system.

In NR, technical specification documentation for uplink Multiple Input Multiple output (MIMO) has been developed (Non-Patent Document 2 and Non-Patent Document 3, for example), and commercial use is expected. In a case where an uplink MIMO is supported at a given band, a terminal has at least two antennas capable of being used in the given band. In contrast, studies are underway regarding the use of space diversity or selection diversity as necessary.

Figure 2:
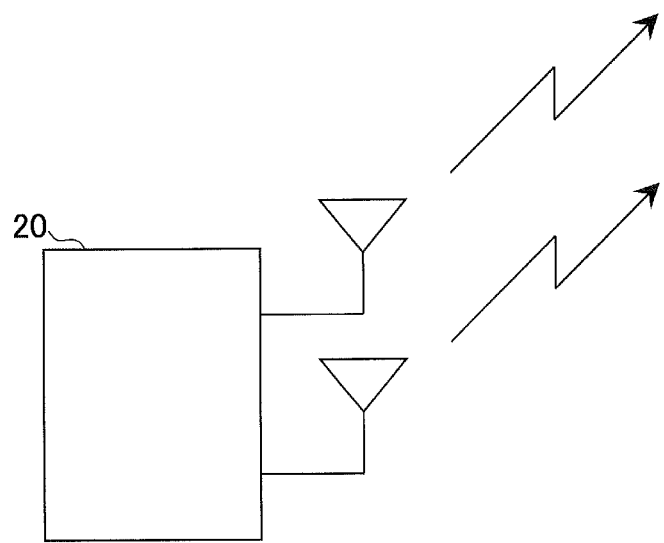
FIG. 2 is a drawing for explaining space diversity.

FIG. 2 is a drawing for explaining space diversity. Space diversity refers to the simultaneous transmission of the same signal from two physically different antennas. FIG. 2 illustrates an example of the terminal 20 simultaneously transmitting the same signal from two antennas. Whether these signals are combined or selected on the receiving side is not described in the embodiment of the present invention.

Figure 3:
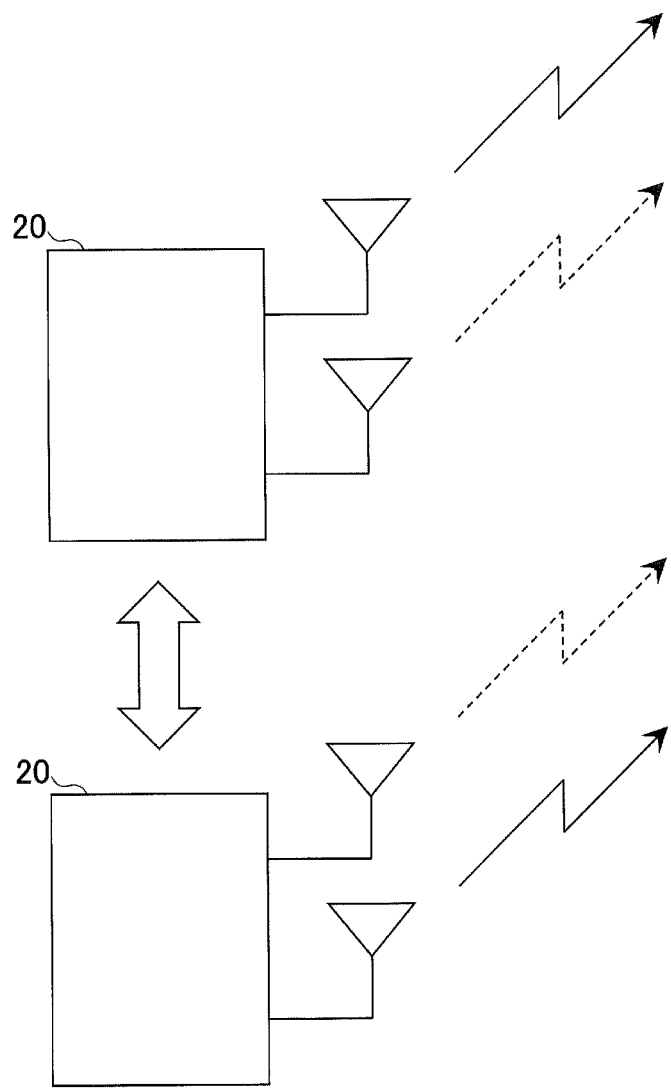
FIG. 3 is a drawing for explaining selection diversity.

FIG. 3 is a diagram for explaining selection diversity. Selection diversity refers to the appropriate transmitting of a signal from one antenna among two physically different antennas at a given moment. FIG. 3 illustrates an example in which the terminal 20 transmits a signal from one of the two antennas at a given moment.

Here, in a case where the terminal 20 is to execute communication by applying transmission diversity, there is a possibility that the switching between the space diversity scheme and selection diversity cannot be performed appropriately because the reception quality on the base station side cannot be directly ascertained. For example, in a case where space diversity is continued even when reception quality on the side of the base station 10 is already sufficient, there is a possibility that more current will be consumed than is necessary.

To resolve this, in a radio communication system, it is an object to determine as to whether or not transmission diversity is executable and to have the terminal 20 appropriately select either space diversity or selection diversity as the transmission diversity scheme.

Figure 4:
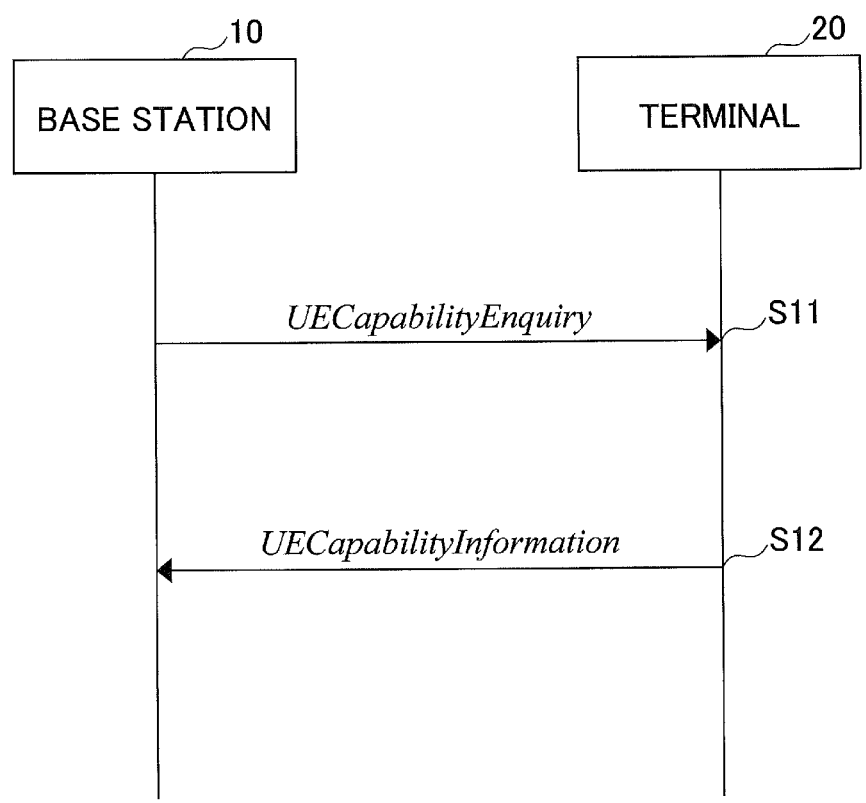
FIG. 4 is a sequence diagram for explaining an example of a capability report according to the embodiment of the present invention.

FIG. 4 is a sequence diagram illustrating an example of a capability report according to the embodiment of the present invention. In the sequence illustrated in FIG. 4, the terminal 20 may report, to the base station 10, a capability indicating whether or not transmission diversity is supported on a per-band basis. The configuration of "capability in which transmission diversity is supported" as meaning that space diversity and selection diversity are supported may be configured in advance or may be configured by a parameter. The "capability in which transmission diversity is supported" may also include the supporting of other transmission diversity schemes.

In step S11, the base station 10 requests a UE capability report by transmitting an RRC message "UECapabilityEnquiry" to the terminal 20. The UECapabilityEnquiry includes information indicating that a report regarding capability in which transmission diversity is supported is requested.

In step S12, the terminal 20 reports the UE capability information by transmitting an RRC message "UECapabilityInformation" to the base station 10. The UE capability information to be reported includes information indicating whether or not transmission diversity is supported on a per-band basis. The UE capability information may include information indicating whether or not transmission diversity is supported for each of a plurality of bands, or may include information indicating whether or not transmission diversity is supported in a band combination such as during CA or during DC or the like. In a case where the information indicating that transmission diversity is supported is transmitted to the base station 10 as the UE capability information, the terminal 20 may execute transmission diversity as necessary. Further, in a case where information indicating that transmission diversity is not supported is transmitted to the base station 10 as the UE capability information, the transmission diversity may or may not be executed. In a case where information indicating that the transmission diversity is supported is not included in the UE capability information, the base station 10 may determine that information indicating that transmission diversity is not supported was sent from terminal 20. Further, in a case where information indicating that capability regarding transmission diversity is not defined in the UE capability information, the base station 10 may determine that information indicating that transmission diversity is not supported was sent from the terminal 20.

Figure 5:
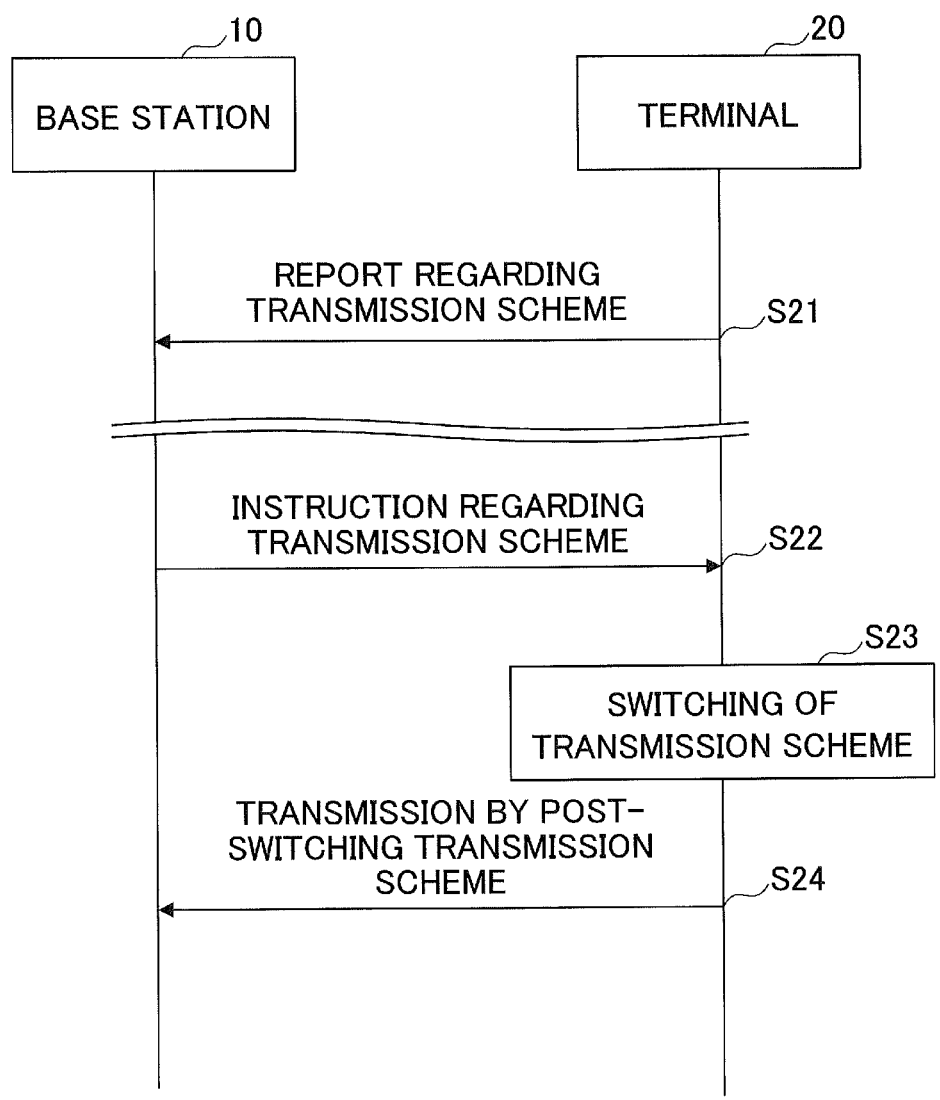
FIG. 5 is a sequence diagram for explaining an example of a transmission operation according to the embodiment of the present invention.

FIG. 5 is a sequence indicating an example of a transmission operation according to the embodiment of the present invention. In the sequence illustrated in FIG. 5, the terminal 20 may indicate, to the base station 10, a transmission diversity scheme that is currently applied. Further, the base station 10 may indicate, to the terminal 20, a transmission diversity scheme to be applied. The transmission diversity scheme may include at least space diversity and selection diversity. The sequence illustrated in FIG. 5 may be executed in a case where the terminal 20 transmitted, to the base station 10, information indicating that transmission diversity is supported as the UE capability information. Further, in a case where information indicating that transmission diversity is not supported is transmitted to the base station 10 by the terminal 10 as the UE capability information, it is not necessary to execute the sequence indicated in FIG. 5.

In step S21, the terminal 20 transmits a report regarding the transmission scheme to the base station 10. The terminal 20 indicates, to a network, as to whether or not transmissions to which either space diversity or selection diversity is applied are being performed based on a given frequency specified in advance or a frequency reported by the network and/or conditions. Further, in a case were selection diversity is applied, the terminal 20 may include information, indicating which antenna is being used, in the report regarding the transmission scheme.

The frequency may be periodic or aperiodic. The condition may be, for example, a timing at which switching to a transmission scheme is to be performed. Further, in a case where only a specific transmission condition for satisfying a limitation due to the Specific Absorption Rate (SAR), a mode in which battery consumption is suppressed, or the like is available, information indicating a reason why either space diversity or selection diversity was applied (SAR, battery, or the like) may be included in the report regarding the transmission scheme.

In step S22, the base station 10 transmits an instruction regarding the transmission scheme to the terminal 20. The instruction regarding the transmission scheme may include information indicating whether to apply either space diversity or selection diversity. Further, in a case where selection diversity is to be applied, the instruction regarding the transmission scheme may include information indicating which antenna of the terminal 20 is to be used.

The instruction regarding the transmission scheme may be transmitted to the terminal 20 periodically at a degree of granularity configured by Radio Resource Control (RRC) signaling or Media Access Control—Control Element (MAC-CE). For example, the degree of granularity may be specified by a number of symbols, may be specified by a number of slots, may be specified by a number of subframes, may be specified by a number of radio frames, and may be specified by a unit such as milliseconds.

In step S23, the terminal 20 changes the transmission scheme based on the received instruction regarding transmission scheme. That is, in a case where the instruction regarding the transmission scheme indicates that space diversity is to be applied, the transmission scheme is changed to transmission diversity, whereas in a case where the instruction regarding the transmission scheme indicates that selection diversity is to be applied, the transmission scheme is changed to selection diversity. Furthermore, in a case where the transmission scheme is to be changed to selection diversity and the received instruction regarding the transmission scheme includes information indicating which antenna is to be used, the terminal 20 performs selection diversity using the antenna indicted. Next, the terminal 20 executes transmission using the post-switching transmission scheme (S24). The terminal 20 can execute efficient transmissions in accordance with the current situation by appropriately selecting either space diversity or selection diversity.

Step S21, step S22, step S23, and step S24 may be executed independently.

In a case where there is no instruction regarding the transmission scheme from the network, the terminal 20 may autonomously switch the transmission scheme to either space diversity or selection diversity. For example, in a case where transmission power is to be reduced in order to satisfy SAR and/or power of a signal transmitted by the antenna is detected as blocked by a person's body, by a proximity sensor included in the terminal 20, selection diversity may be applied and a more suitable antenna (whose gain is not lost) may be used. Further, in a case where reception of a raising command of power control continues while the terminal 20 is transmitting at close to maximum transmission power, space diversity may be applied or if selection diversity is currently applied, the transmission scheme may be switched to space diversity.

As described in the example embodiment above, in a case where transmission diversity is supported, the terminal 20 can report capability regarding support of transmission diversity to the base station 10. Moreover, the terminal 20 can report, to the base station 10, the transmission diversity scheme that is currently applied. Furthermore, by applying the transmission diversity scheme determined by the base station 10 on the reception side, the terminal 20 can execute efficient transmissions in accordance with the current situation. Moreover, the terminal 20 can autonomously determine an effective transmission diversity scheme and execute efficient transmissions in accordance with the current situation.

That is, in a radio communication system, a terminal can execute a transmission diversity scheme as necessary.

<Apparatus Configuration>

Next, an example of functional configuration of the base station 10 and the terminal 20 that execute the processing and operations described so far will be described. The base station 10 and the terminal 20 include a function for implementing the above-described embodiment. However, each of the base station 10 and the terminal 20 may alternatively have only some of the functions in the embodiment.

<Base Station 10>

Figure 6:
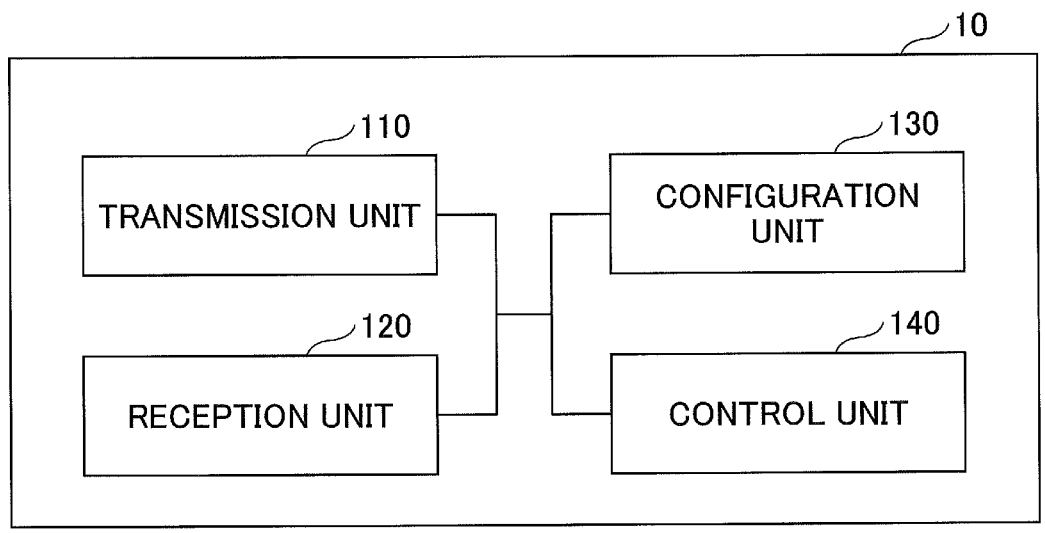
FIG. 6 is a drawing illustrating an example of a functional configuration of a base station 10 according to the embodiment of the present invention.

FIG. 6 is a drawing illustrating an example of a functional configuration of the base station 10. As illustrated in FIG. 6, the base station 10 includes a transmission unit 110, a reception unit 120, a configuration unit 130, and a control unit 140. The functional configuration illustrated in FIG. 6 is only an example. As long as the operation according to the embodiment of the present invention can be executed, the functions may be divided in any way, and the functional units may be given any names.

The transmission unit 110 includes a function of generating signals to be transmitted to the terminal 20 and wirelessly transmitting the signals. The reception unit 120 includes a function of wirelessly receiving various types of signals transmitted from the terminal 20 and acquiring, for example, information on a higher layer from the received signals. Further, the transmission unit 110 has a function of transmitting NR-PSS, NR-SSS, NR-PBCH, a DL/UL control signal, or the like to the terminal 20.

The configuration unit 130 stores, into a storage device, configuration information configured in advance and various configuration information to be transmitted to the terminal 20, and reads the configuration information from the storage device as necessary. The contents of the configuration information are, for example, configurations regarding transmission diversity in the terminal 20.

As described in the embodiment, the control unit 140 determines information for configuring transmission diversity in the terminal 20. Also, the control unit 140 performs configuring for transmission diversity for the terminal 20. The functional unit regarding signal transmission in the control unit 140 may be included in the transmission unit 110, and the functional unit regarding signal reception in the control unit 140 may be included in the reception unit 120.

<Terminal 20>

Figure 7:
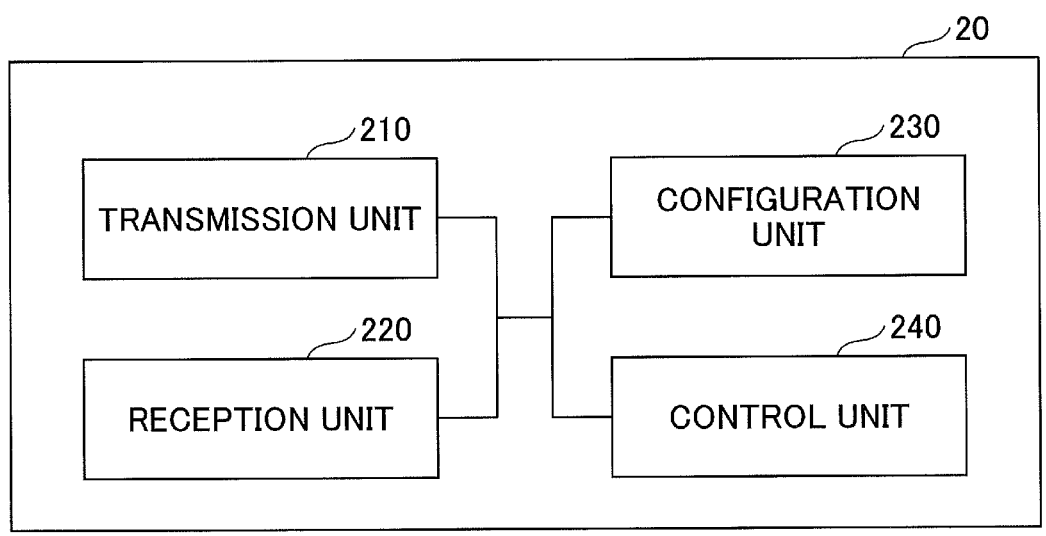
FIG. 7 is a drawing illustrating an example of a functional configuration of a terminal 20 according to the embodiment of the present invention.

FIG. 7 is a drawing illustrating an example of a functional configuration of the terminal 20. As illustrated in FIG. 7, the terminal 20 includes a transmission unit 210, a reception unit 220, a configuration unit 230, and a control unit 240. The functional configuration illustrated in FIG. 7 is merely an example. As long as the operation according to the embodiment of the present invention can be executed, the functions may be divided in any way, and the function units may be given any names.

The transmission unit 210 generates a transmission signal from transmission data and wirelessly transmits the transmission signal. The reception unit 220 wirelessly receives various types of signals, and acquires a signal in a higher-layer from the received signal in the physical layer. Also, the reception unit 220 has a function of receiving NR-PSS, NR-SSS, NR-PBCH, DL/UL/SL control signals, reference signals, and the like that are transmitted from the base station 10. Also, for example, in D2D communication, the transmission unit 210 transmits, to another terminal 20, a Physical Sidelink Control Channel (PSCCH), a Physical Sidelink Shared Channel (PSSCH), a Physical Sidelink Discovery Channel (PSDC), a Physical Sidelink Broadcast Channel (PSBCH), and the like. The reception unit 220 receives the PSCCH, the PSSCH, the PSDCH, the PSBCH, and the like, from the other terminal 20.

The configuration unit 230 stores various types of configuration information received from the base station 10 or the terminal 20 by the reception unit 220 into the storage device, and reads the configuration information from the storage device as necessary. The configuration unit 230 also stores configuration information configured in advance. The contents of the configuration information include, for example, configuration of transmission diversity in the terminal 20.

As described in the embodiment, the control unit 240 executes the configuration regarding transmission diversity configured from the base station 10. The control unit 240 indicates the report regarding transmission diversity to the base station 10. A functional unit configured to transmit signals in the control unit 240 may be included in the transmission unit 210, and a functional unit configured to receive signals in the control unit 240 may be included in the reception unit 220.

<Hardware Configuration>

The block diagrams (FIGS. 6 and 7) used for explaining the above embodiments illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmission unit or a transmitter. As described above, a method for implementing these functions is not particularly limited.

Figure 8:
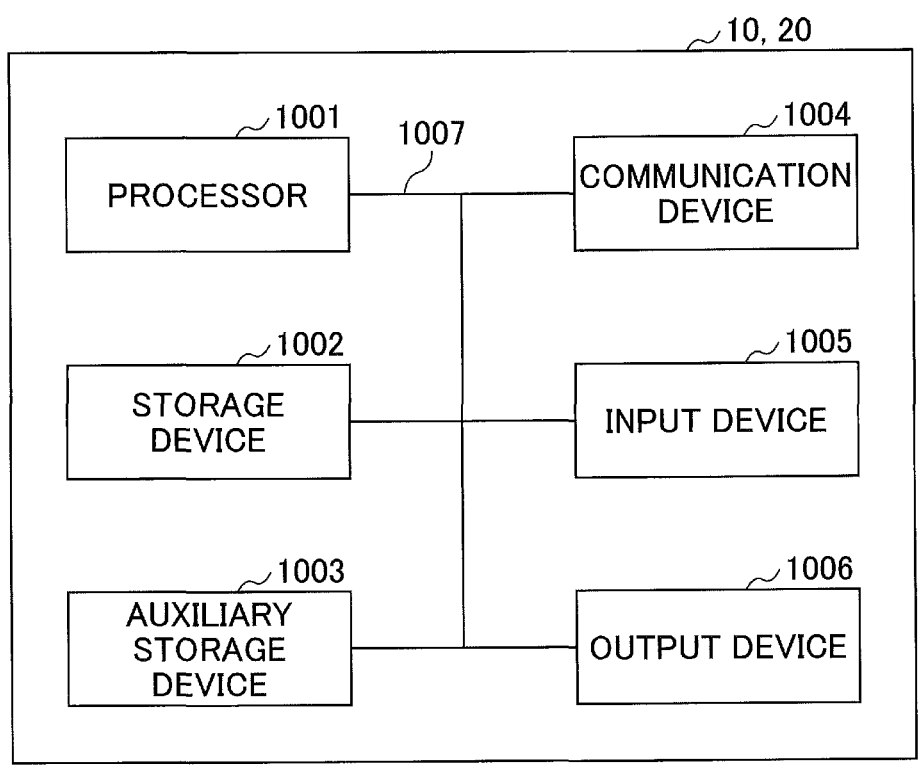
FIG. 8 is a drawing illustrating an example of a hardware configuration of the base station 10 or the terminal 20 according to the embodiment of the present invention.

For example, the base station 10, the terminal 20, and the like according to one embodiment of the present disclosure may function as a computer that performs processing of a wireless communication according to the present disclosure. FIG. 8 is a drawing illustrating an example of a hardware configuration of the base station 10 or the terminal 20 according to an embodiment of the present disclosure. Each of the base station 10 and terminal 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station 10 and the terminal 20 may be configured to include one or more of the devices illustrated in drawings, or may be configured not to include some of the devices.

Each function of the base station 10 and the terminal 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station 10, as illustrated in FIG. 6, may be implemented by a control program that is stored in the storage device 1002 and that is executed by the processor 1001. Also, for example, the control unit 240 of the terminal 20, as illustrated in FIG. 7, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a Read Only Memory (ROM), an Erasable Programmable ROM (EPROM), an Electrically Erasable Programmable ROM (EEPROM), a Random Access Memory (RAM), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a Compact Disc ROM (CD-ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmission and reception unit, a transmission line interface, and the like may be implemented by the communication device 1004. The transmission and reception unit may be implemented in such a manner that a transmission unit and a reception unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station 10 and the terminal 20 may include hardware, such as a microprocessor, a digital signal processor (DSP), an Application Specific Integrated Circuit (ASIC), a Programmable Logic Device (PLD), or a Field Programmable Gate Array (FPGA), or alternatively, some or all of the functional blocks may be implemented by the hardware. For example, the processor 1001 may be implemented with at least one of these hardware components.

Summary of Embodiment

As described above, according to the embodiment of the present invention, provided is a terminal that includes a transmission unit configured to transmit, to a base station, information indicating whether or not transmission diversity is supported, a reception unit configured to receive, from the base station, information indicating a transmission diversity scheme in a case where transmission diversity is supported, and a control unit configured to switch to a transmission diversity scheme based on the information indicating the transmission diversity scheme, wherein the transmission unit is configured to perform transmission by applying the transmission diversity scheme to which the switch was made.

According to the above configuration, by applying the transmission diversity scheme determined by the base station 10 on the reception side in a case where transmission diversity is supported, the terminal 20 can execute efficient transmissions in accordance with the current situation. In other words, in the radio communication system, the terminal can execute a transmission diversity scheme as necessary.

The transmission diversity scheme may be space diversity or selection diversity. According to the above configuration, the terminal 20 can execute efficient transmissions in accordance with the current situation by applying the transmission diversity scheme determined by the base station 10 on the reception side.

In a case where the information indicating the transmission diversity scheme indicates selection diversity, the reception unit may further receive, from the base station, information regarding an antenna to be used in selection diversity, and the transmission unit may perform transmission by using the antenna to be used. According to the above configuration, the terminal 20 can execute efficient transmissions in accordance with the current situation by using the antenna and the transmission diversity scheme determined by the base station 10 on the reception side.

The transmission unit may transmit, to the base station, information indicating the applied transmission diversity scheme. According to the above configuration, the terminal 20 can execute efficient transmissions in accordance with the current situation by reporting, to the base station 10, the applied transmission diversity scheme, and by using the antenna and the transmission diversity scheme determined by the base station 10 on the reception side.

Also, according to the embodiment of the present invention, provided is a transmission procedure configured to transmit, to a base station, information indicating whether or not transmission diversity is supported; a reception procedure configured to receive, from the base station, information indicating a transmission diversity scheme in a case where transmission diversity is supported; a control procedure configured to switch to a transmission diversity scheme based on information indicating the transmission diversity scheme, wherein the transmission procedure includes a procedure configured to perform transmission by applying the transmission diversity scheme to which the switch was made.

According to the above configuration, by applying the transmission diversity scheme determined by the base station 10 on the reception side in a case where transmission diversity is supported, the terminal 20 can execute efficient transmissions in accordance with the current situation. In other words, in the radio communication system, the terminal can execute a transmission diversity scheme as necessary.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiments, the orders of steps may be changed unless a contradiction arises. For the sake of convenience for describing the processing, the base station 10 and the terminal 20 have been described with the use of the functional block diagrams, but these apparatuses may be implemented by hardware, software, or a combination thereof. Each of software functioning with a processor of the base station 10 according to the embodiment of the present invention and software functioning with a processor of the terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, Downlink Control Information (DCI), Uplink Control Information (UCI)), higher layer signaling (for example, (Radio Resource Control (RRC) signaling, Medium Access Control (MAC) signaling, broadcast information (a Master Information Block (MIB)) and an System Information Block (SIB)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as Long Term Evolution (LTE), LTE-A (LTE-Advanced), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), or Bluetooth (registered trademark), and a next-generation system expanded on the basis thereof. Also, a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station 10 described in the present disclosure may in some cases be performed by an upper node. It is clear that, in a network that includes one or more network nodes including the base station 10, various operations performed for communication with the terminal 20 can be performed by at least one of the base station 10 and another network node other than the base station 10 (for example, a MME, a S-GW, or the like may be mentioned, but not limited thereto). In the above, the description has been made for the case where another network node other than the base station 10 is a single node as an example. But other network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station Remote Radio Head (RRH)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "terminal (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an Internet of Things (IoT) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of terminals 20 (that may be called Device-to-Device (D2D), Vehicle-to-Everything (V2X), or the like). In this case, a terminal 20 may have above-described functions of the base station 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station. In this case, a base station may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled"

together with the use of electromagnetic energy such as electromagnetic energy having a wavelength of the radio frequency range, the microwave range, or the light range (including both of the visible light range and the invisible light range).

A reference signal can be abbreviated as a Reference Signal (RS). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each terminal 20 to assign, in TTI units, radio resources (such as frequency bandwidths, transmission power, and the like that can be used by each terminal 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also, this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

REFERENCE SIGNS LIST 10 base station
110 transmission unit
120 reception unit
130 configuration unit
140 control unit
20 terminal
210 transmission unit
220 reception unit
230 configuration unit
240 control unit
30 core network
1001 processor
1002 storage device
1003 auxiliary storage device
1004 communication device
1005 input device
1006 output device

The invention claimed is:

1. A terminal comprising:
a processor configured to include, in a UECapabilityInformation message, information indicating whether transmission diversity is supported for each of a plurality of bands; and
a transmitter configured to transmit, to a base station, the UECapabilityInformation message including the information indicating whether transmission diversity is supported for each of the plurality of bands.

2. The terminal according to claim 1, wherein the processor is configured to include, in the UECapabilityInformation message, information indicating whether transmission diversity is supported in a band combination during Carrier Aggregation, CA, or during Dual Connectivity, DC.

3. A communication method executed by a terminal, the method comprising:
including, in a UECapabilityInformation message, information indicating whether transmission diversity is supported for each of a plurality of bands; and
transmitting, to a base station, the UECapabilityInformation message including the information indicating whether transmission diversity is supported for each of the plurality of bands.

4. A radio communication system comprising:
a terminal; and
a base station,
wherein the terminal includes
a processor configured to include, in a UECapability Information message, information indicating whether transmission diversity is supported for each of a plurality of bands, and
a transmitter configured to transmit, to the base station, the UECapability Information message including the information indicating whether transmission diversity is supported for each of the plurality of bands, and
wherein the base station includes
a receiver configured to receive the UECapabilityInformation message.

* * * * *